(12) United States Patent
Gilani et al.

(10) Patent No.: US 10,628,447 B1
(45) Date of Patent: Apr. 21, 2020

(54) SYSTEMS AND METHODS FOR UPDATING DATA CONTENT

(71) Applicant: EMC IP Holding Company LLC, Hopkinton, MA (US)

(72) Inventors: Irfan Gilani, Austin, TX (US); Muninder Arram, Hyderabad (IN)

(73) Assignee: EMC IP Holding Company LLC, Hopkinton, MA (US)

(*) Notice: Subject to any disclaimer, the term of this patent is extended or adjusted under 35 U.S.C. 154(b) by 204 days.

(21) Appl. No.: 15/884,905

(22) Filed: Jan. 31, 2018

(51) Int. Cl.
| | |
|---|---|
| *G06F 15/16* | (2006.01) |
| *G06F 16/27* | (2019.01) |
| *G06F 8/35* | (2018.01) |
| *H04L 29/08* | (2006.01) |
| *G06F 16/958* | (2019.01) |

(52) U.S. Cl.
CPC ............ *G06F 16/27* (2019.01); *G06F 8/35* (2013.01); *G06F 16/958* (2019.01); *H04L 67/34* (2013.01); *H04L 67/02* (2013.01); *H04L 67/10* (2013.01)

(58) Field of Classification Search
CPC .......... G06F 16/958; G06F 8/35; G06F 16/27; H04L 67/34; H04L 67/02; H04L 67/10
See application file for complete search history.

(56) References Cited

U.S. PATENT DOCUMENTS

| | | | | |
|---|---|---|---|---|
| 2014/0089619 | A1* | 3/2014 | Khanna | G06F 16/273 711/166 |
| 2016/0065670 | A1* | 3/2016 | Kimmel | H04L 67/1097 709/219 |
| 2019/0050165 | A1* | 2/2019 | Kito | G06F 3/0656 |

\* cited by examiner

*Primary Examiner* — Abdulkader M Alriyashi
(74) *Attorney, Agent, or Firm* — Daly, Crowley Mofford & Durkee, LLP

(57) ABSTRACT

A system for updating data content including one or more computer data processors programmed and configured to generate one or more instances of data programming objects, each instance of a data programming object representing a data record and properties of the data record, at least one property corresponding to a scheduled change in the data record. The system includes an object monitor to which one or more status updates of the one or more instances of data programming objects are transmitted to, the status updates including the property corresponding to the time of the scheduled change in the data record. The object monitor includes one or more object monitor processors programmed and configured to receive and store the transmitted status updates of the one or more instances of data programming objects, merge and consolidate the transmitted status updates of the instances of one or more data programming objects within a computer data repository, and transmit the merged and consolidated to one or more client nodes.

20 Claims, 5 Drawing Sheets

SYSTEMS AND METHODS FOR UPDATING DATA CONTENT

BACKGROUND

It is common for product configurations presented on seller websites to be periodically refreshed with newer or different components, attributes, prices, and buyer-selectable options. In some cases, listed products and/or such configurations may expire and/or be replaced with entirely different products or product features.

In many data processing systems for managing such web sites, data representing the products is stored in upstream systems (e.g., web site servers) which process and query backend systems for periodic updates. There could be millions or more changes that occur across a group of products over a refresh cycle and the amount of data needing to be processed in the upstream systems can subsequently result in heavy bottlenecks.

Expirations of various products and sub-components also typically need to be handled by the upstream data processors as they survey the downstream processors (e.g., product vendors) for updates during each refresh cycle. Additionally, the changes that happen to sub components of the products can affect hundreds of thousands or more products across multiple regions and catalogs, which typically require heavy reliance on relatively few upstream data processors.

Thus, new techniques for improving the efficiency of such data processing systems and eliminating the aforementioned bottlenecks is desired.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Aspects of embodiments are directed to systems and methods for managing data updates within volumes of data across multiple layers of back end and front end processors.

In an embodiment, a system for updating data content includes one or more computer data processors programmed and configured to generate one or more instances of data programming objects, each instance of a data programming object representing a data record and properties of the data record, at least one property corresponding to a scheduled change in the data record, transmit to an object monitor one or more status updates of the one or more instances of data programming objects, the status updates including the property corresponding to the time of the scheduled change in the data record. In an embodiment, the object monitor includes one or more object monitor processors programmed and configured to receive and store the transmitted status updates of the one or more instances of data programming objects, merge and consolidate the transmitted status updates of the instances of one or more data programming objects within a computer data repository, the status updates including updated changes to the data records corresponding to the instances of one or more data programming objects, transmit the merged and consolidated status updates of the instances of one or more data programming objects to one or more client nodes according to a predetermined staggered time schedule, and clear the transmitted status updates of the instances of one or more data programming objects stored within the object monitor between each transmission of the status updates by the object monitor.

In an embodiment, the object monitor is further programmed and configured to transmit the merged and consolidated status updates as a hash string to the one or more client nodess.

In an embodiment, the property corresponding to a scheduled change in the data record is controlled by a timer of the corresponding instance of a data programming object.

In an embodiment, the scheduled change in the data record corresponds to an expiration time of at least one of the data records.

In an embodiment, merging and consolidating the transmitted status updates of the instances of one or more data programming objects includes overwriting outdated status updates of the instances of one or more data programming objects.

In an embodiment, merging and consolidating the transmitted status of the instances of one or more data programming objects includes merging and consolidating different levels of granularity of status updates transmitted by the computer data processors.

In an embodiment, generating one or more instances of data programming objects is prompted by a request received from the one or more client nodes.

In an embodiment, one or more computer data processors are further programmed and configured to receive a request from the one or more client nodes to expire an instance of the one or more instances of data programming objects and, in response to the expiration request, delete the corresponding instance of the data programming object and transmit the expired status of the corresponding instance of the data programming object to the object monitor.

In an aspect of described embodiments, computer implemented method for updating data content includes generating one or more instances of data programming objects, each instance of a data programming object representing a data record and properties of the data record, at least one property corresponding to a scheduled change in the data record if a change in the data record is scheduled, transmitting to an object monitor one or more status updates of the one or more instances of data programming objects, the status updates including the property corresponding to the time of the scheduled change in the data record if a change in the data record is scheduled, receiving at the object monitor the transmitted status updates of the one or more instances of data programming objects, merging and consolidating the transmitted status updates of the instances of one or more data programming objects within a computer data repository, the status updates including updated changes to the data records corresponding to the instances of one or more data programming objects, transmitting the merged and consolidated status updates of the instances of one or more data programming objects to one or more client nodes according to a predetermined staggered time schedule, and clearing the transmitted status updates of the instances of one or more data programming objects stored within the object monitor between each transmission of the status updates by the object monitor.

In an embodiment, transmitting the merged and consolidated status updates includes transmitting the merged and consolidated updates as hash strings.

In an embodiment, the property corresponding to a scheduled change in the data record is controlled by a timer member of the corresponding instance of a data programming object.

In an embodiment, the scheduled change in the data record corresponds to an expiration time of at least one of the data records.

In an embodiment, merging and consolidating the transmitted status updates of the instances of one or more data programming objects includes overwriting outdated status updates of the instances of one or more data programming objects.

In an embodiment, merging and consolidating the transmitted status of the instances of one or more data programming objects includes merging and consolidating different levels of granularity of status updates transmitted by the computer data processors.

In an embodiment, generating one or more instances of data programming objects is prompted by a request received from the one or more client nodes.

In an embodiment, the computer implemented method further includes receiving a request from the one or more client nodes to expire an instance of the one or more instances of data programming objects and, in response to the expiration request, deleting the corresponding instance of the data programming object and transmitting the expired status of the corresponding instance of the data programming object to the object monitor.

In an aspect of embodiments, a computer program product for updating data content is provided, the computer program product including a non-transitory computer-readable storage medium encoded with computer-executable program code programmed to cause the execution across one or more processors of generating one or more instances of data programming objects, each instance of a data programming object representing a data record and properties of the data record, at least one property corresponding to a scheduled change in the data record, transmitting to an object monitor one or more status updates of the one or more instances of data programming objects, the status updates including the property corresponding to the time of the scheduled change in the data record, receiving at the object monitor the transmitted status updates of the one or more instances of data programming objects, merging and consolidating the transmitted status updates of the instances of one or more data programming objects within a computer data repository, the status updates including updated changes to the data records corresponding to the instances of one or more data programming objects, transmitting the merged and consolidated status updates of the instances of one or more data programming objects to one or more client nodes according to a predetermined staggered time schedule, and clearing the transmitted status updates of the instances of one or more data programming objects stored within the object monitor between each transmission of the status updates by the object monitor.

In an embodiment, the computer-executable program code is further programmed to cause transmitting the merged and consolidated status updates as hash strings.

In an embodiment, the computer-executable program code is further programmed to cause the property corresponding to a scheduled change in the data record to be controlled by a timer member of the corresponding instance of a data programming object.

In an embodiment, the scheduled change corresponds to an expiration of the data record.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. Furthermore, the drawings are not necessarily to scale, emphasis instead being placed on the concepts disclosed herein.

DETAILED DESCRIPTION

Aspects of embodiments are directed to systems and methods for managing data updates within volumes of data across multiple layers of back end and front-end processors.

It will be further understood that various changes in the details, materials, and arrangements of the parts that have been described and illustrated herein might be made by those skilled in the art without departing from the scope of the following claims.

Figure 1:
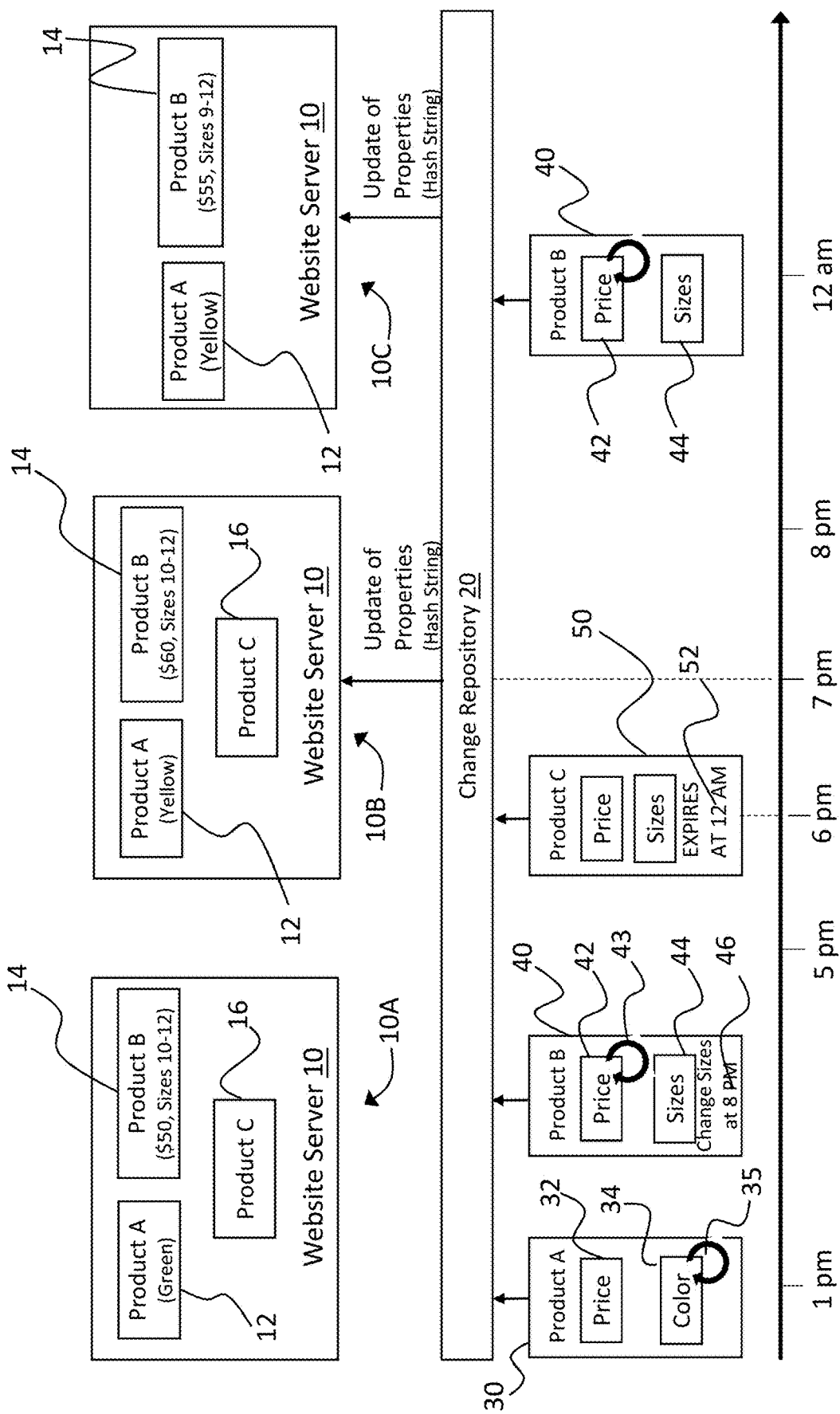
FIG. 1 is an illustrative block diagram of an exemplary process and data flow of utilizing a data processing system according to embodiments.

Referring to FIG. 1, an illustrative block diagram of an exemplary process and data flow utilizing a data processing system over a period of time is shown according to embodiments. A website server 10 manages the presentation and sale of a series of products A (12), B (14), and C (16). In an embodiment, website server 10 begins in a state 10A as at a particular time in which the various products A, B, and C are presented with particular attributes/properties (e.g., color, price, and available sizes). The website server 10 is configured in states 10B and 10C at later times, while between the states the website server 10 is updated with updates from a change repository 20 according to embodiments.

In an embodiment, each of the products is associated with a programming object, instances of which include object 30 representing product A, object 40 representing product B, and object 50 representing product C. In an embodiment, the object instances can reside on backend servers (e.g., backend servers 350 and 360 shown in FIG. 3) through which changes in the status and features of a product can be made. For example, a backend server can be maintained by a manufacturer of product A while an independent reseller operates the website server 10 in order to present and sell the product to consumers.

At a time after state 10A of the website server 10 occurs, for example, a price 32 and available color 34 of product A is changed with an update 35 in the object 30. Object 30 then transmits the update to change repository 20. Object 40 is also modified with update 43 to price 42 and a scheduled future update 46 (to occur at 8 PM) to available sizes 44 of product B. Object 40 then transmits the updated price 42 and scheduled change 46 to sizes 44 to the change repository 20. Object 50 is also modified with a scheduled expiration (i.e., termination of the availability of the product C) at 12 AM with change 52.

In an embodiment, after an object transmits updates to change repository 20, change repository 20 will merge and consolidate the transmitted updates with previous updates of the object and store them for future scheduled transmission to a front-end destination (e.g., website server 10 as shown in the state 10B at 7 PM). In embodiments, updates to each of the objects A, B, and C are further consolidated together and/or compressed (e.g., as hash string(s)) for purposes of transmission to the destination. In embodiments, small scale changes (e.g., a change in the size of a memory chip incorporated in a consumer computer product) and large-scale changes (e.g., wholesale change in the type of memory chip in the computer product) are merged so as to reduce duplication or irrelevance of update transmissions from the change repository.

In an embodiment, if a product is scheduled to expire before a scheduled change to a product feature, for example, there is no need to transmit an update from the change repository regarding the scheduled change in the product feature. In an embodiment, the change repository will analyze and consolidate such changes to optimize the efficiency in update transmissions to front end processors (e.g., web server 10).

In an embodiment, when an update having a scheduled future change (e.g., future expiration 52 of product C) is transmitted to a front-end destination, the front end destination will automatically process the change to the product at the designated time so as to avoid repeated querying of a back-end server about the product status (e.g., expiration status of a product). For example, the scheduled expiration 52 of product C is sent by object 50 to the change repository 20, where the update is then consolidated with other updates from other objects before being transmitted to the website server 10. In this instance, website server 10 now knows to expire product C at 12 AM, which is reflected in state 10C of website server 10.

Figure 4:
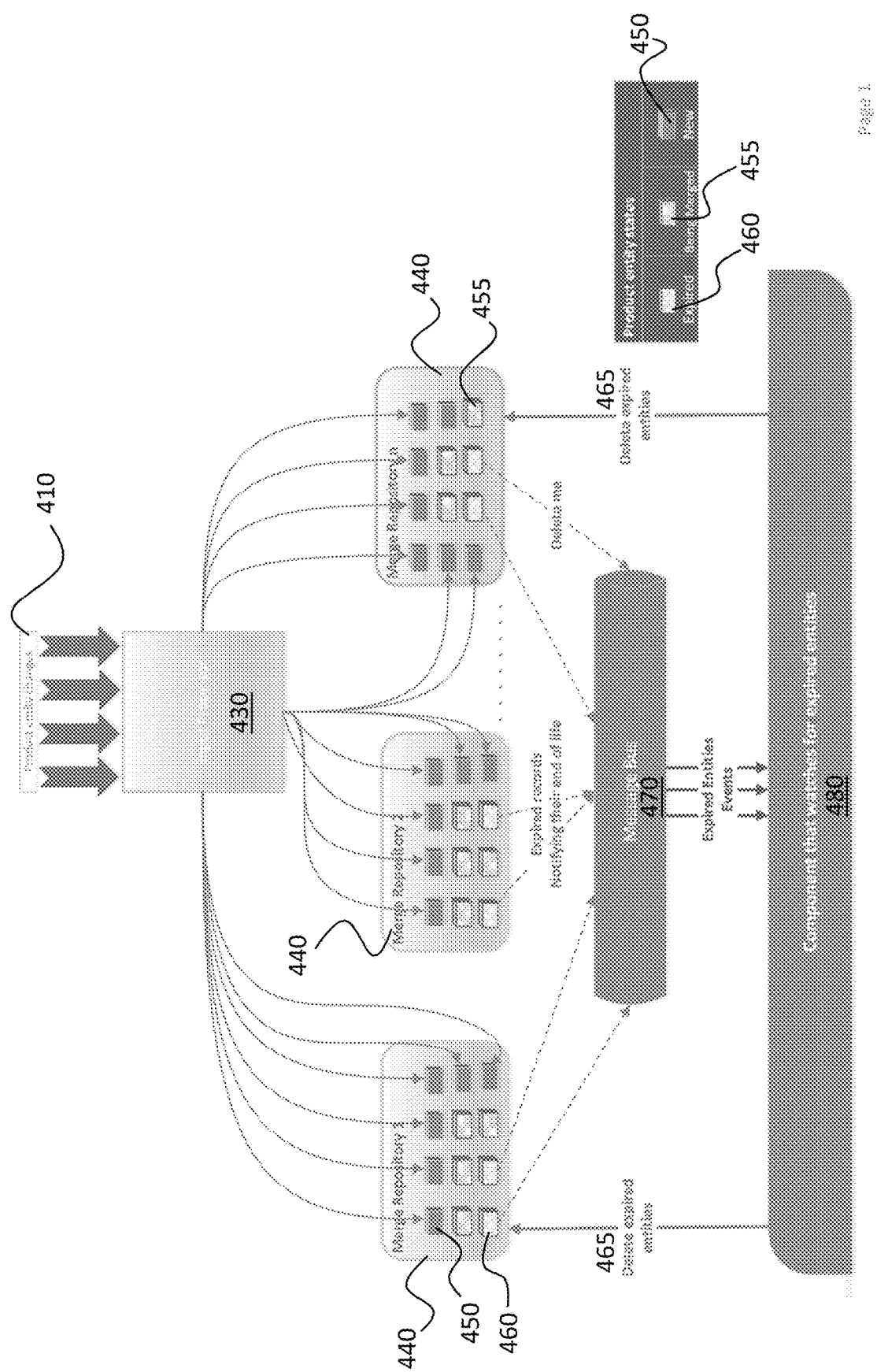
FIG. 4 is an exemplary data flow diagram for a data processing system according to embodiments.

Embodiments with the described objects for individually managing various products and product features is scalable in a horizontal fashion. That is, any number of objects can reside on any number of backend servers where product information and updates are originally generated and can be utilized to update multiple client nodes with changes and/or expirations of the products and/or product features. In embodiments, in order to provide real-time processing of modifications can occur through a message bus and a component dedicated to processing certain types of changes (e.g., expirations, such as shown in FIG. 4).

Figure 2:
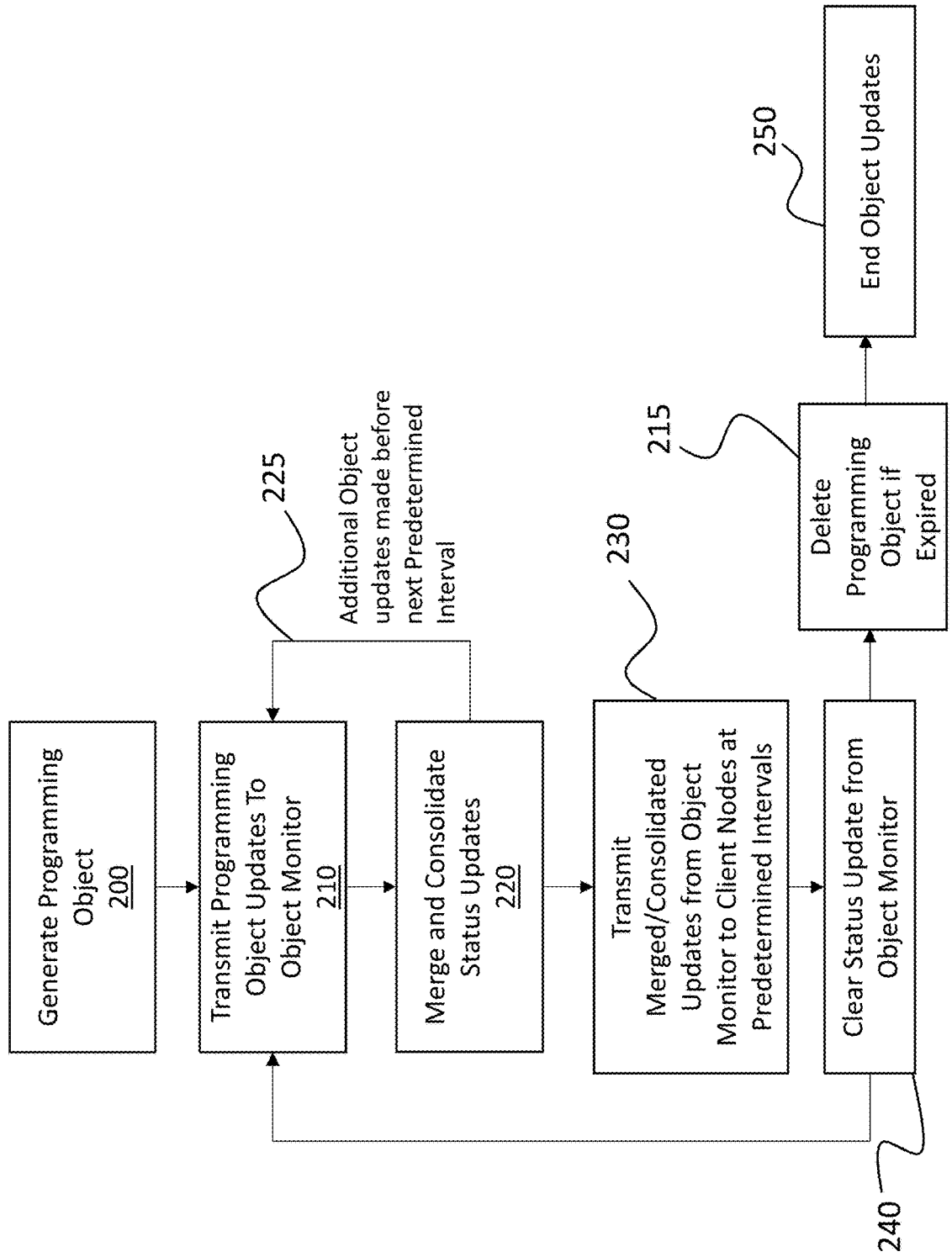
FIG. 2 is an illustrative block flow diagram of a process flow according to embodiments.

FIG. 2 is an illustrative block flow diagram of a process flow according to embodiments. A programming object representing data (e.g., data corresponding to a product) is generated at block 200. When data represented by the object is modified or scheduled to be modified, an update of the modifications is sent to an object monitor at block 210, including the timing of any scheduled modifications. If the data represented by the object is expired, the object can be deleted at block 215. Updates to the data can be merged and consolidated with other (e.g., previous) updates at block 220 such as described herein.

At predetermined intervals, the object monitor updates client nodes (e.g., front end processors of the data) at block 230 with the merged and consolidated modifications (e.g., including an expiration status and/or scheduled future modifications). In an embodiment, the updates are transmitted using hash strings representing the merged and consolidated modifications. In embodiments, updates 210 to the object(s) transmitted to the object monitor continue to be merged and consolidated via return 225 before the next predetermined merged update 230.

Once an update has been sent to the client node(s), the object monitor can be cleared of the updates/modifications for the programming object at block 240. If the object is expired at block 240, the object is deleted at block 215 and processing of object updates for the deleted object ends at block 250. Otherwise, processing repeats at block 210 where further updates can be processed by the object monitor.

Figure 3:
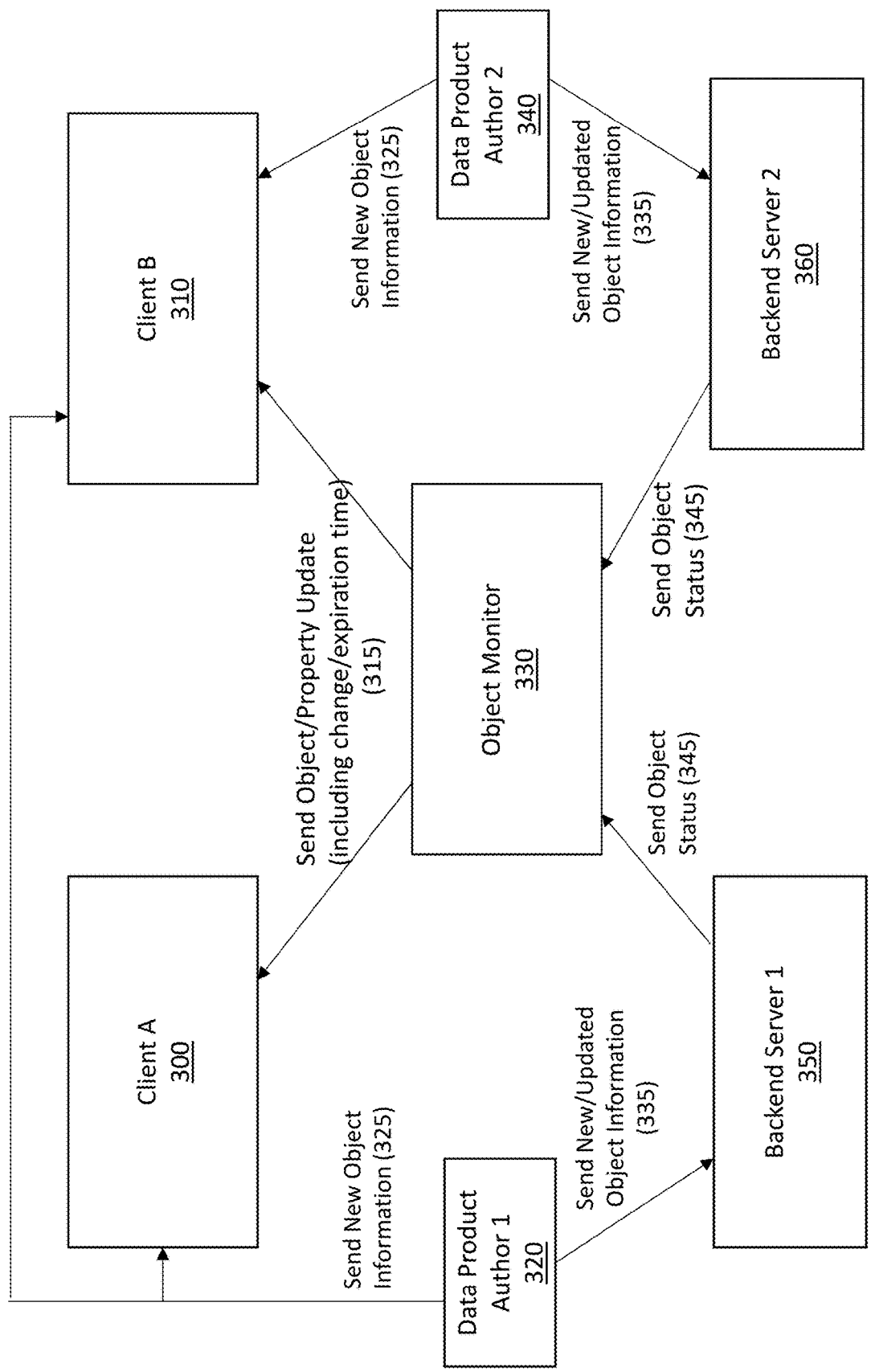
FIG. 3 is a block diagram of data processing system components according to embodiments.

FIG. 3 is a block diagram of data processing system components according to embodiments. In an embodiment, an object monitor 330 processes data objects created by a data product author 1 (block 320) and data product author 2 (block 340), the instances of which are created and maintained at back-end server 1 (350) and 2 back-end server 2 (360). The object monitor 330 receives updates to the data objects from backend servers 1 (350) and 2 (360), then consolidates and merges the modifications. The object monitor periodically updates client nodes A (block 300) and B (block 310) with the updates (e.g., as hash strings) such as described further herein.

In an embodiment, when an author (320 or 340) creates a new object, both the corresponding backend server (350 or 360) and client node(s) (300 and/or 310) will be sent the new object information (at steps 325 and 335). Subsequently, further updates to the data object will be processed (i.e., merged and consolidated) at the object monitor 330 prior to being transmitted at 315 to clients A (block 300) and/or B (310).

FIG. 4 is an exemplary data flow diagram for a data processing system according to embodiments. Product changes to various products are transmitted at block 410 to an input processor 430. In an embodiment, the input processor 430 forwards the changes to one of n merge repositories 440. In embodiments, different merge repositories correspond to different categories of objects (e.g., product type, customer type/base). In an embodiment, a processing component 480 is dedicated to monitoring the expiration status (or other changes) of objects for which the merge repositories 440 collect status updates for the objects. In an embodiment, each object (e.g., representing a product) can have one of among 3 statuses (new (450), being merged (455), and expired (460)). If the current object status is new or if the latest updates involve merged changes then there is no expiration and no expiration status needs to be updated or transmitted. In embodiment, other changes to object properties can be similarly processed.

Changes to the expiration status of objects are forwarded from the merge repositories 440 to a message bus 470 where they can be consolidated and forwarded to component 480 that monitors the objects for an expiration status. When an object becomes expired, component 480 can signal for the deletion of the object and update the merge repositories at 465 accordingly. In embodiments, component 480 is configured to operate in a real-time manner as an object monitor at least in part by utilizing the message bus 480, thus almost instantaneously processing updates reflecting product and/or product feature expirations.

Figure 5:
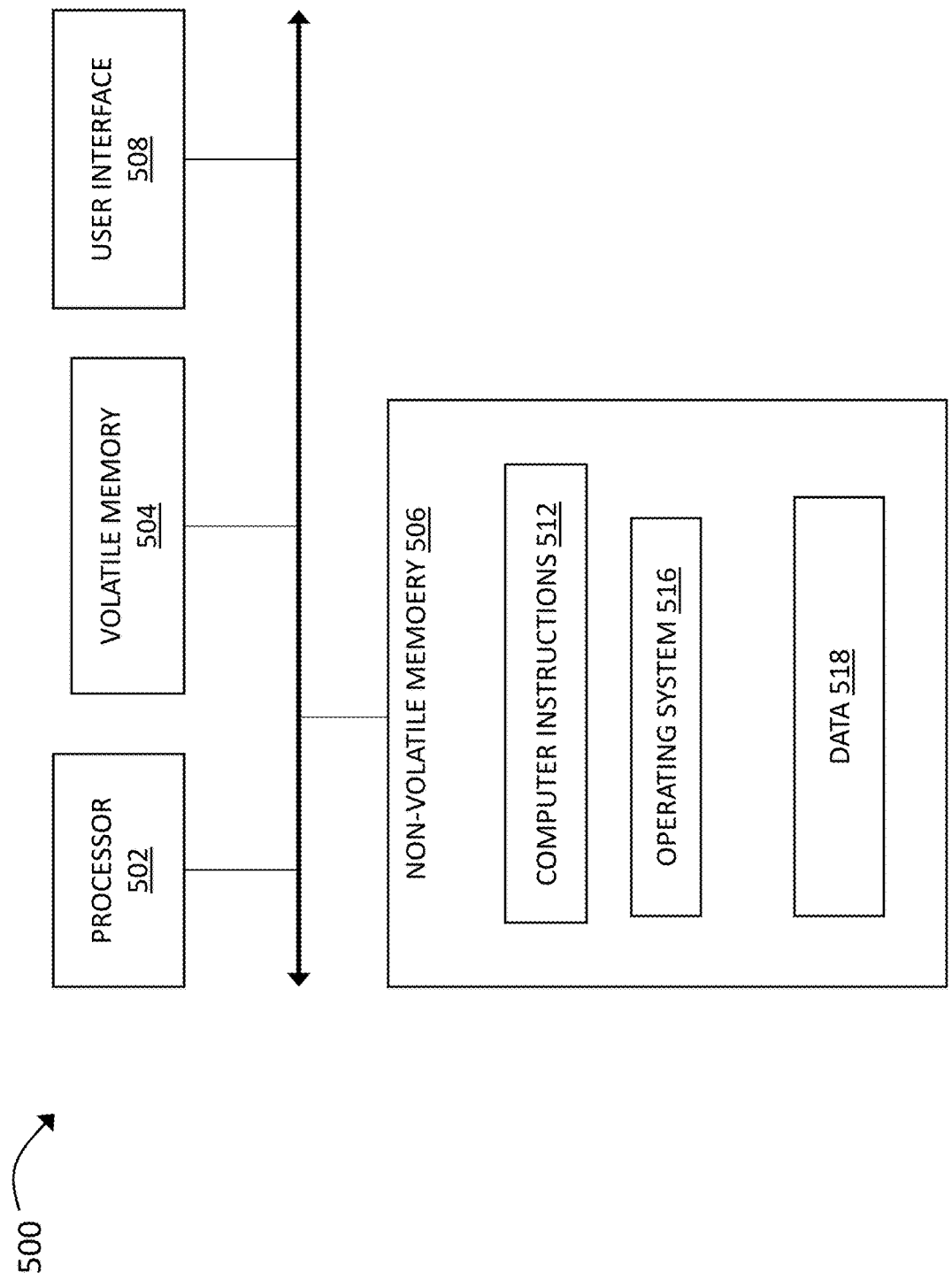
FIG. 5 is an illustrative block diagram of a computer system/processor for programming and configuring various components of a data processing system according to embodiments.

Referring to FIG. 5, an illustrative block diagram of an embodiment is provided of a computer system/controller 500 used with various devices of the data processing system in accordance with embodiments (e.g., such as the object monitor 330, backend servers 350 and 360, and client nodes 300 and 310 shown and described in reference to FIG. 3). A computer system 500 includes a processor 502, a volatile memory 504, a non-volatile memory 506 (e.g., hard disk)

and a user interface (UI) 508 (e.g., a graphical user interface, a mouse, a keyboard, a display, touch screen and so forth). The non-volatile memory 506 stores computer instructions 512, an operating system 516 and data 518. In one example, the computer instructions 512 are executed by the processor 502 out of volatile memory 504 to perform all or part of the processes described herein (e.g., processes illustrated and described in reference to FIGS. 1 through 4).

These processes are not limited to use with particular hardware and software; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. In embodiments, the processor can include ASIC, FPGA, and/or other types of circuits. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes of FIGS. 1 through 4 are not limited to the specific processing order illustrated. Rather, any of the processing blocks of the Figures may be re-ordered, combined or removed, performed in parallel or in serial, as necessary, to achieve the results set forth above.

The processing blocks associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing the embodiments and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports may be referred to by the same name and are interchangeable for purposes here.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts that have been described and illustrated herein might be made by those skilled in the art without departing from the scope of the following claims.

The invention claimed is:

1. A system for updating data content comprising:
one or more computer data processors programmed and configured to:
generate one or more instances of data programming objects, each instance of a data programming object representing a data record and properties of the data record, at least one property corresponding to a scheduled change in the data record;
transmit to an object monitor one or more status updates of the one or more instances of data programming objects, the status updates including the property corresponding to the time of the scheduled change in the data record;
wherein the object monitor includes one or more object monitor processors programmed and configured to:
receive and store the transmitted status updates of the one or more instances of data programming objects;
merge and consolidate the transmitted status updates of the instances of one or more data programming objects within a computer data repository, the status updates including updated changes to the data records corresponding to the instances of one or more data programming objects, wherein merging and consolidating the status updates includes dropping one of the status updates based on an expiration time of any of the programming objects;
transmit the merged and consolidated status updates of the instances of one or more data programming objects to one or more client nodes according to a predetermined staggered time schedule; and
clear the transmitted status updates of the instances of one or more data programming objects stored within the object monitor between each transmission of the status updates by the object monitor.

2. The system of claim 1 wherein the object monitor is further programmed and configured to transmit the merged and consolidated status updates as a hash string to the one or more client nodes.

3. The system of claim 1 wherein the property corresponding to a scheduled change in the data record is controlled by a timer member of the corresponding instance of a data programming object.

4. The system of claim 1 wherein the scheduled change in the data record corresponds to an expiration time of at least one of the data records.

5. The system of claim 1 wherein merging and consolidating the transmitted status updates of the instances of one or more data programming objects comprises overwriting outdated status updates of the instances of one or more data programming objects.

6. The system of claim 1 wherein merging and consolidating the transmitted status of the instances of one or more data programming objects comprises merging and consolidating different levels of granularity of status updates transmitted by the computer data processors.

7. The system of claim 1 wherein generating one or more instances of data programming objects is prompted by a request received from the one or more client nodes.

8. The system of claim 1 wherein said one or more computer data processors are further programmed and configured to:
receive a request from the one or more client nodes to expire an instance of the one or more instances of data programming objects; and,
in response to the expiration request, delete the corresponding instance of the data programming object and transmit the expired status of the corresponding instance of the data programming object to the object monitor.

9. A computer implemented method for updating data content comprising:
generating one or more instances of data programming objects, each instance of a data programming object representing a data record and properties of the data record, at least one property corresponding to a scheduled change in the data record;
transmitting to an object monitor one or more status updates of the one or more instances of data programming objects, the status updates including the property corresponding to the time of the scheduled change in the data record;
receiving at the object monitor the transmitted status updates of the one or more instances of data programming objects;
merging and consolidating the transmitted status updates of the instances of one or more data programming objects within a computer data repository, the status updates including updated changes to the data records corresponding to the instances of one or more data programming objects, wherein merging and consolidating the status updates includes dropping one of the status updates based on an expiration time of any of the programming objects;
transmitting the merged and consolidated status updates of the instances of one or more data programming objects to one or more client nodes according to a predetermined staggered time schedule; and
clearing the transmitted status updates of the instances of one or more data programming objects stored within the object monitor between each transmission of the status updates by the object monitor.

10. The computer implemented method of claim 9 wherein transmitting the merged and consolidated status updates comprises transmitting the merged and consolidated updates as hash strings.

11. The computer implemented method of claim 9 wherein the property corresponding to a scheduled change in the data record is controlled by a timer member of the corresponding instance of a data programming object.

12. The computer implemented method of claim 9 wherein the scheduled change in the data record corresponds to an expiration time of at least one of the data records.

13. The computer implemented method of claim 9 wherein merging and consolidating the transmitted status updates of the instances of one or more data programming objects comprises overwriting outdated status updates of the instances of one or more data programming objects.

14. The computer implemented method of claim 9 wherein merging and consolidating the transmitted status of the instances of one or more data programming objects comprises merging and consolidating different levels of granularity of status updates transmitted by the computer data processors.

15. The computer implemented method of claim 9 wherein generating one or more instances of data programming objects is prompted by a request received from the one or more client nodes.

16. The computer implemented method of claim 9 further comprising:
   receiving a request from the one or more client nodes to expire an instance of the one or more instances of data programming objects; and,
   in response to the expiration request, deleting the corresponding instance of the data programming object and transmitting the expired status of the corresponding instance of the data programming object to the object monitor.

17. A computer program product for updating data content, the computer program product comprising a non-transitory computer-readable storage medium encoded with computer-executable program code programmed to cause the execution across one or more processors of:
   generating one or more instances of data programming objects, each instance of a data programming object representing a data record and properties of the data record, at least one property corresponding to a scheduled change in the data record;
   transmitting to an object monitor one or more status updates of the one or more instances of data programming objects, the status updates including the property corresponding to the time of the scheduled change in the data record;
   receiving at the object monitor the transmitted status updates of the one or more instances of data programming objects;
   merging and consolidating the transmitted status updates of the instances of one or more data programming objects within a computer data repository, the status updates including updated changes to the data records corresponding to the instances of one or more data programming objects, wherein merging and consolidating the status updates includes dropping one of the status updates based on an expiration time of any of the programming objects;
   transmitting the merged and consolidated status updates of the instances of one or more data programming objects to one or more client nodes according to a predetermined staggered time schedule; and
   clearing the transmitted status updates of the instances of one or more data programming objects stored within the object monitor between each transmission of the status updates by the object monitor.

18. The computer program product of claim 17 wherein the computer-executable program code is further programmed to cause transmitting the merged and consolidated status updates as hash strings.

19. The computer program product of claim 17 wherein the computer-executable program code is further programmed to cause the property corresponding to a scheduled change in the data record to be controlled by a timer member of the corresponding instance of a data programming object.

20. The computer program product of claim 19 wherein the scheduled change corresponds to an expiration of the data record.

* * * * *